March 15, 1932.  F. A. PEARSON  1,849,881
TRANSLUCENCY MEASURING APPARATUS
Filed June 18, 1928
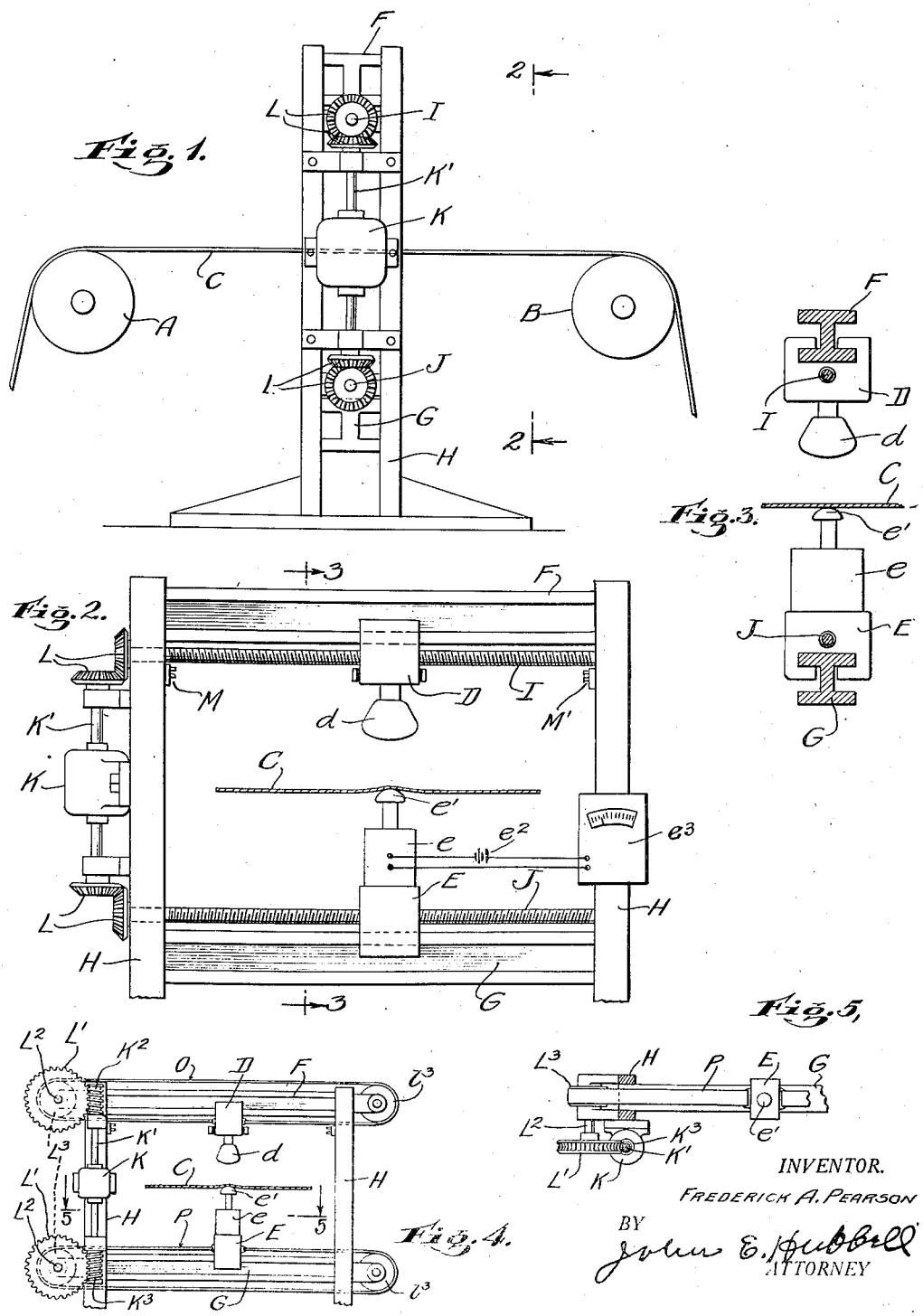
INVENTOR.
FREDERICK A. PEARSON
BY John E. Hubbell
ATTORNEY Patented Mar. 15, 1932

1,849,881

UNITED STATES PATENT OFFICE

FREDERICK A. PEARSON, OF GREAT BARRINGTON, MASSACHUSETTS

TRANSLUCENCY MEASURING APPARATUS

Application filed June 18, 1928. Serial No. 286,369.

The general object of the present invention is to provide simple and effective apparatus for measuring the light transmitting properties of translucent material in the form of thin extended bodies, and particularly the translucent properties of webs of paper, cloth, or film material, or of liquids held between extended glass plates or walls. The invention was especially devised and is especially adapted for use in measuring the light transmitting properties of a travelling web of paper, cloth or film material as such web is being fed past a measuring station in the course of its manufacture or of some treatment process. The ultimate purpose of such measurement is ordinarily to determine some physical characteristic of the web material other than its light transmitting property, but dependent upon the latter.

The invention is characterized by the mounting of a source of light, ordinarily an electric lamp, and a light responsive device ordinarily a photo-electric cell, on separate carriages movable along parallel trackways located on the opposite sides of the material to be examined, and the provision in conjunction therewith of means, which may take various forms but ordinarily comprises a power shaft and gearing connecting the latter to the two carriages, for synchronously imparting movements similar in magnitude and direction to the two carriages.

The measurements obtained with the apparatus described, may be direct measurements in some cases, but ordinarily they are relative rather than absolute, and comprise a comparison which may be effected between the response of the light responsive device to the light transmitted by the material undergoing examination, to some standard which may be the response of a similar light responsive device to the light transmitted by a standard or comparison web material.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of the invention.

Of the drawings:—

Fig. 1 is an elevation of apparatus in which one form of my invention is embodied;

Fig. 2 is a section on the line 2—2 of Fig. 1;

Fig. 3 is a section on the line 3—3 of Fig. 2;

Fig. 4 is a view taken similarly to Fig. 2 illustrating a modified construction; and Fig. 5 is a partial section on the line 5—5 of Fig. 4.

In Figs. 1, 2 and 3, I have illustrated the use of one embodiment of my invention in apparatus for measuring the light transmitting properties of a travelling web C of material travelling over rolls A and B. The measuring apparatus proper comprises an electric lamp $d$ supported by a carriage D, and a photo-electric cell $e$ mounted on a carriage E. The carriage D is movable transversely to the direction of travel of the web, from one side edge to the other of the latter, on a guide or trackway F. The latter as conventionally illustrated, is an I-beam, the ends of which are supported in standards or pedestals H located at the opposite sides of the web. The carriage is shown as formed with an under-cut slot receiving the bottom flanges or base of the beam F. The carriage E is similarly mounted for movement along a guide or trackway G in the form of an I-beam also having its ends connected to, and supported by the standards H. The under-cut slot of the carriage E receives the upper flanges of the beam G.

The means shown in Figs. 1, 2 and 3 for giving similar simultaneous movements to the carriages D and E along the trackways F and G, comprise a reversible electric motor K mounted on one of the standards H, and gearing connecting the motor shaft to the two carriages. As shown, this gearing comprises rotatable screw spindles I and J in threaded engagement with the carriages D and E, respectively. The shaft I is journalled in the standards H, and is connected by bevel gears L to the corresponding end of the motor shaft K' which projects from the opposite ends of the frame of the motor K. The other end of the motor shaft K' is similarly connected by bevel gears L to the screw spindle J. The latter may be identical with the spindle I except that, with the bevel gear connections illustrated, the inclination of the thread on the spindle I should be opposite to the thread inclination on the spindle J.

With the described arrangement movements similar in magnitude and direction are simultaneously imparted to the carriages D and E by the rotation of the motor shaft K'. By suitably controlling the speed and direction of rotation of the motor K the carriages D and E may be caused to move back and forth with any desired speed from one side edge to the other of the web C. In consequence, the portions of the travelling web C not directly transmitting light from the source $d$ to the receiving device $e$ comprises wedge-shaped portions having their bases at the side edges of the web. The length of the bases of these portions may be made as short as desired by properly proportioning the speed of travel of the carriages D and E, to that of the web C. To automatically reverse the motor when the carriages reach one limit of their movement in either direction reversing switches M of known type may be mounted on the standards H. To insure the proper position at all times of the web C relative to the light source $d$ and the light responsive device $e$, and particularly to the latter, the device $e$ may advantageously be provided with a web contacting surface $e'$ engaging the web and deflecting the latter upward slightly from the position which it would otherwise assume as indicated in Figs. 2 and 4.

With the mechanism described, the light transmitting properties of the travelling web may be measured or compared, by arranging the photo-cell $e$ in an electrical circuit containing a suitable energizing device $e^2$ and a current measuring or comparing instrument $e^3$, as conventionally illustrated in Fig. 2. Cell energizing and current measuring and comparing devices suitable for the purpose are disclosed and claimed in my prior application, Serial No. 204,397, filed July 8, 1927.

As already indicated, the mechanism by which the carriages supporting the source of light $d$ and light responsive device $e$ are given their movements, may be of widely varying form. In Figs. 4 and 5, for example, the carriage D is given its movements by means of a flexible element O which may be a sprocket chain, wire or cable, a leather belt, or analogous device, and has its ends connected to the carriage D at opposite sides of the latter, and which is looped about pulleys $L^3$ and $l^3$ which are journalled in the standards H. The pulley $L^3$ is carried by a shaft $L^2$ rotated by a worm gear $L'$ in mesh with a worm $K^2$ carried by the corresponding end of the shaft $K'$ of the motor K. The pulley $l^3$ is an idler. A flexible element P, which is shown as similar to the element O and similarly mounted and driven, is employed to move the carriage E along the trackway G. With the arrangement shown in Figs. 4 and 5, the inclination of the thread on the worm $K^2$ in mesh with the gear $L'$ giving movement to the carriage D, should be opposite to the inclination of the thread on the worm $K^3$ carried by the opposite end of the shaft K', and in mesh with the worm gear $L'$ giving motion to the carriage E.

The invention is adapted to a wide variety of uses but is of especial utility in connection with web processing machines to determine the weight thickness or some analogous characteristic of a web by measuring its light transmitting properties. For example, in the manufacture of paper it is common to dry and calender wide webs which are subsequently longitudinally slitted to form a plurality of narrower strips. In such case, it is desirable to detect variations in weight which result from variations in thickness and produce variations in translucency, not only as such variations may occur along the length of the web, but also along the width of the web in order that the material in the subsequently formed narrow strips may conform to the same specification standards. With the apparatus described, the movement of the source of light and photo-electric cell back and forth across the travelling web will result in the detection of variations in thickness longitudinally of the web, or transversely of the latter, quickly enough to permit accurate adjustments of the paper making or process machinery to be made before any considerable amount of material varying from the desired standard has passed through the apparatus.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent is:—

1. In apparatus of the character described, the combination of a source of light, a carriage upon which said source is mounted, a light responsive device, a second carriage upon which said device is mounted, parallel trackways on which said carriages are movably guided, means for synchronously imparting movements similar in direction and magnitude to the two carriages, and a measuring instrument connected to said device.

2. In apparatus of the character described, the combination of a source of light, a carriage upon which said source is mounted, a light responsive device, a second carriage upon which said device is mounted, parallel trackways upon which said carriages are mounted, a motor, gearing connecting said motor to each of said carriages and adapted to give synchronous movements similar in magnitude and direction to the two carriages along said trackways, and a measuring instrument connected to said device.

3. The combination with means for continuously advancing a travelling web of substantial width, of means for measuring the light transmitting properties of said web comprising a pair of trackways extending transversely to the direction of travel of the web across said path and located at opposite sides of the latter, a separate carriage mounted on and movable along each of said trackways, a source of light carried by one of said carriages, a light responsive device carried by the other of said carriages, mechanism including a power shaft located at the side of the path of travel and gearing connecting said power shaft to said carriages for imparting synchronous movements similar in magnitude and direction to the two carriages, and a measuring instrument connected to said device.

4. Apparatus of the character described comprising in combination means for continuously advancing an elongated strip of web material of substantial width along a definite path of travel, a source of light at one side of said path, a cooperating photo-electric cell at the other side of said path, means for giving said light source and cell similar reciprocating movements transversely of said path, and a measuring instrument connected to said cell.

5. Apparatus for measuring the light transmitting properties of a web of translucent material of substantial width comprising means for continuously advancing said web along a horizontal path of movement, of a pair of standards at opposite sides of said path, vertically spaced horizontal trackways extending transversely between said standards at opposite sides of said web, a carriage guided on and supported from the upper of said trackways, a source of light carried by said carriage adjacent the upper side of said web, a second carriage guided and supported on the lower of said trackways, a photo-electric cell carried by said second carriage adjacent the underside of said web, a reversible electric motor, mechanism connecting said motor and carriages for imparting synchronous movements similar in magnitude and direction to said carriages, cooperating provisions on one of said carriages and said standards for controlling the direction of rotation of said motor, and a measuring instrument connected to said photo-electric cell.

6. Apparatus for measuring the light transmitting properties of a web of translucent material of substantial width comprising means for continuously advancing said web along a definite path of travel, a source of light at one side of said web, a photo-electric cell at the other side of said web, and electric power mechanism for simultaneously imparting reciprocating movements to said light source and cell transversely of said path, whereby said light source and cell move through a series of diagonal paths relative to said web.

Signed at Great Barrington, in the county of Berkshire and State of Massachusetts, this 15th day of June, A. D. 1928.

FREDERICK A. PEARSON.